United States Patent [19]

Shotts et al.

[11] Patent Number: 5,567,088
[45] Date of Patent: Oct. 22, 1996

[54] METHOD FOR TREATING POROUS MEDIA

[75] Inventors: Noel J. Shotts, Bakersfield, Calif.; Billy W. Surles; Philip D. Fader, both of Houston, Tex.

[73] Assignee: Texaco, Inc., White Plains, N.Y.

[21] Appl. No.: 357,958

[22] Filed: Dec. 16, 1994

[51] Int. Cl.$^6$ .................................................. E02D 3/12
[52] U.S. Cl. ........................... 405/270; 405/263; 405/57; 166/295
[58] Field of Search .................... 405/53, 55, 56, 405/57, 263, 270, 128–129; 166/288, 295

[56] References Cited

U.S. PATENT DOCUMENTS

| | | | |
|---|---|---|---|
| 4,790,668 | 12/1988 | Castor | 405/128 |
| 4,842,072 | 6/1989 | Friedman et al. | 166/295 |
| 4,903,770 | 2/1990 | Friedman et al. | 166/288 |
| 4,913,585 | 4/1990 | Thompson et al. | 405/128 |
| 5,114,275 | 5/1992 | West et al. | 405/270 X |
| 5,199,492 | 4/1993 | Surles et al. | 166/295 |
| 5,260,502 | 11/1993 | Fryer | 405/57 X |

OTHER PUBLICATIONS

Deeley, "Sealing Of Pits" Feb. 7, 1989.

*Primary Examiner*—David J. Bagnell
*Assistant Examiner*—Frederick L. Lagman
*Attorney, Agent, or Firm*—James L. Bailey; Richard A. Morgan; Kenneth R. Priem

[57] ABSTRACT

Methods are disclosed for treating porous media such as subsurface storage tanks or excavations therefore to form primary or secondary permeability barriers. A treatment fluid comprising a polymerizable monomer, a diluent therefor, and a strong acid catalyst mixed with steam is injected into a volume to be treated and contacted with the interior surface thereof. Contact is maintained for a duration sufficient to cause polymerization to occur forming an impermeable barrier in or on the interior surface of the treated volume.

9 Claims, 1 Drawing Sheet

METHOD FOR TREATING POROUS MEDIA

BACKGROUND OF THE INVENTION

This invention relates to method for treating porous media to render such media relatively impermeable. More particularly this invention relates to methods for forming primary or secondary impermeable media barriers around subsurface and surface storage tanks such as used in filling stations for vehicles or in oil and gas refineries.

Environmental considerations have led to regulations on subsurface storage tanks for hydrocarbons or other chemicals, that such tanks have both a primary wall containment and a secondary wall containment to protect against failure of the primary wall containment. The present invention provides methods for treating, for example, older design, relatively porous, concrete hydrocarbon storage tanks internally to repair them and to vastly increase their impermeability. Similarly, the techniques of the present invention can be used to create secondary permeability barriers in the relatively porous soil surrounding such subsurface tanks by treating the surrounding soil itself prior to the installation of such a tank. In yet another application the methods of the present invention can be used to mix with aggregate material to form a relatively impervious or impermeable cement for use in forming either primary or secondary containment barriers in or about subsurface chemical or hydrocarbon storage tanks.

BRIEF DESCRIPTION OF THE INVENTION

The present invention comprises methods for treating porous media to render them relatively impermeable. This is accomplished by use of a multiphase fluid comprising steam containing a polymerizable monomer with the catalyst already mixed with the resin in order to achieve a more uniform mixing and contacting the medium to be treated with this fluid. The treating fluid and its properties are described with more particularity in coassigned U.S. Pat. No. 4,903,770 in which the use of such a fluid in sand control in producing oil wells is taught. The present invention contemplates the use of such a polymerizable fluid having properties tailored to its use in treating subsurface porous media to create relatively impermeable barriers as opposed to the creation of relatively permeable screens or filters in deep oil or gas production wells to prevent encroachment of sand into such wells.

BRIEF DESCRIPTION OF THE DRAWINGS

The present invention may best be understood by reference to the appended drawings, which are intended as illustrative only and not as limitative, and in which.

DETAILED DESCRIPTION OF THE INVENTION

U.S. Pat. Nos. 4,903,770 and 4,842,072, which are coassigned to the assignee of the present invention, and which are incorporated herein by reference, disclose with great particularity the chemistry of the single fluid, single injection step polymerizable monomer, which is the agent of choice in the method of the present invention for treating porous media to render them relatively impermeable. The polymerizable monomer, preferably furfuryl alcohol, an organic diluent such as a low carbon alcohol and a nonvolatile acid catalyst which can safely be mixed with steam on the surface so that a single, multiple phase fluid containing steam, catalyst and the monomer can be delivered to contact the material to be treated is used. In some instances when steam quality is below about 70%, an ester such as butyl acetate is also included in the treating fluid. It is desired that the catalytic action be sufficiently slow at ordinary surface ambient temperatures that there is no danger of premature reaction of the resin resulting in the plugging of surface mixing, injection or pumping equipment. The catalyst activity is dependent on fluid pH, temperature and monomer concentration. In the preferred embodiment for use with steam quality in the range of 50 to 100 percent the treating fluid contains steam and a mixture comprising from 20 to 50 percent polymerizable monomer, preferably furfuryl alcohol, from 80 to 50 percent of a diluent, preferably a low carbon alcohol such as methanol, and sufficient non-volatile strong acid such as sulfuric acid to produce a fluid comprising the furfuryl alcohol, diluent and acid having an acid normality of from 0.10 to 1.0 and preferably 0.25 to 0.50. The normality of the acid is critical in controlling the reaction rate. When the steam quality falls below about 80 percent, an ester such as butyl acetate should be incorporated in the fluid mixture.

Figure 1:
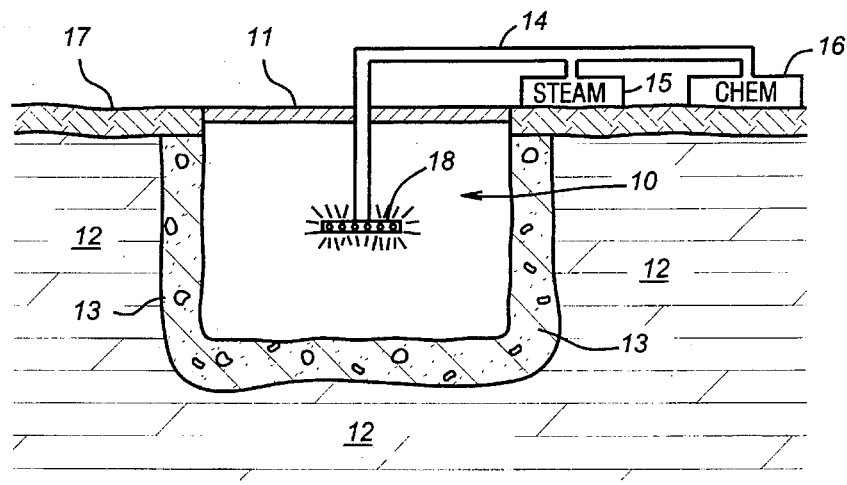
FIG. 1 is a schematic diagram showing a sectional view of the method of the invention for treating earth materials in the vicinity of a subsurface storage tank to create a secondary permeability barrier.

Referring initially to FIG. 1, a setup for treating porous media in a subsurface storage tank excavation prior to tank installation is shown schematically. A tank excavation 10 into a highly porous medium such as sand 12 is illustrated. A concrete slab 17 represents the typical surface environment encountered in the service station environment for which treatment of the tank excavation 10 is recommended. The object of this treatment is to provide a treated zone 13 of material in the porous medium 12, which is highly impermeable, non-chemically reactive and forms an effective secondary permeability barrier exterior to the tank to be installed in the excavation 10. During treatment a temporary top 11, of steel or the like, is provided for closing the top of excavation 10. A central opening is provided in the temporary top 11 through which passes, approximately, tubing 14 through which the treating material previously described is supplied to a rotating nozzle 18. The controllable viscosity of the treatment fluid propelled by the steam is such that the nozzle 18 delivers it uniformly to the floor and side walls of excavation 10 where it penetrates into the porous medium 12. Treatment chemical is supplied from a supply tank 16 and pumped via an injection assembly such as will be discussed in more detail with respect to FIG. 3, to a steam generator 15 where the steam and chemical mixture comprising the treatment fluid is formed. The treatment fluid is then propelled through tubing 14 via nozzle 18 to the medium 12 where it penetrates and sets up or solidifies into an impermeable solid form.

Figure 2:
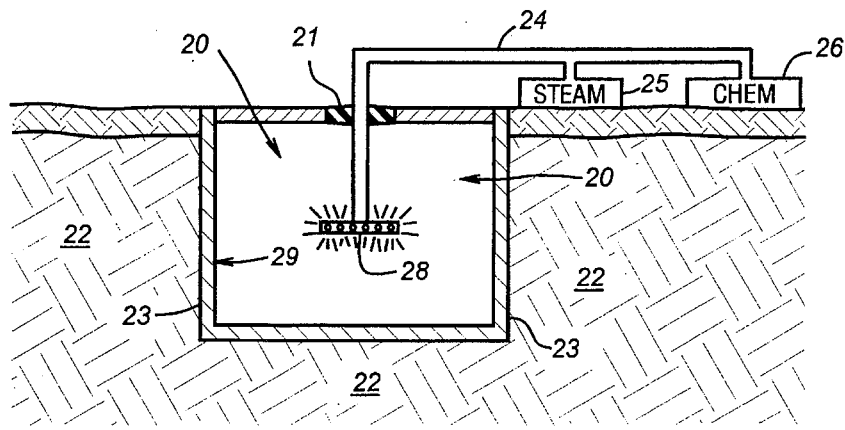
FIG. 2 is a schematic diagram showing a sectional view of the method of the present invention for treating and repairing an older relatively permeable concrete storage tank to enhance its impermeability or to create a primary permeability barrier.
Figure 3:
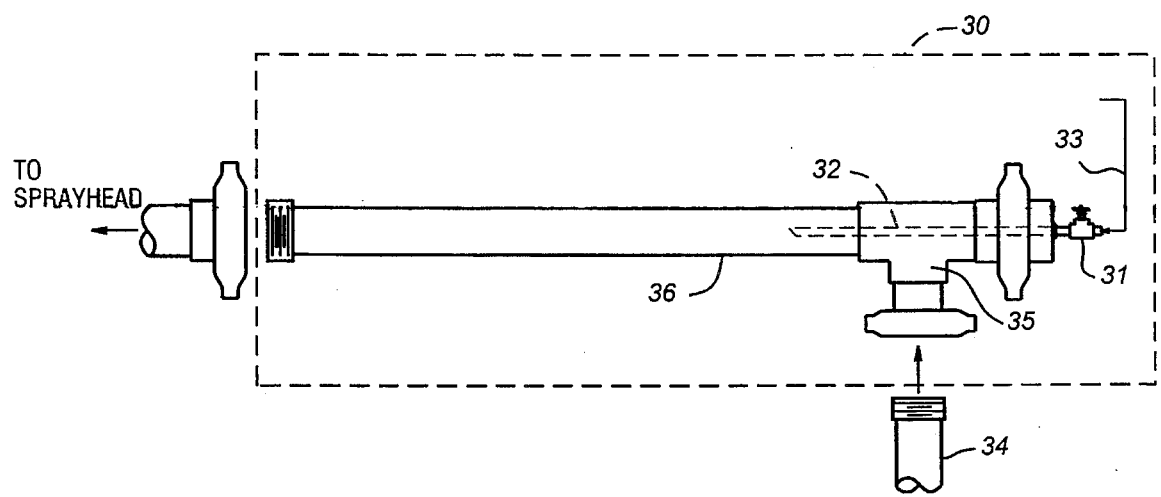
FIG. 3 is a schematic drawing showing a furfuryl alcohol injection assembly for use in performing the methods of the present invention.

Referring now to FIG. 2, a similar set up is shown for applying the treatment fluid previously described to an older design concrete subsurface storage tank 23 to render its interior surface 29 relatively impermeable, thereby repairing or creating a primary permeability barrier. Again, treatment chemical as described is pumped from a tank 26 via an injection assembly such as shown in FIG. 3 to a line 14 where steam from a steam generator 25 joins it. Tubing or pipe 24 penetrates the tank 23 filler opening 21 and conveys the treatment fluid resin and steam mixture to a rotating spray head or nozzle 28. The controlled viscosity fluid exits the nozzle 28 and is conveyed to the top, bottom and walls of the tank where it contacts the interior surface 29, penetrating it to a degree and solidifies into a relatively impermeable solid coating thereon. This forms a solid, chemically inert, primary permeability barrier interior to the tank 23 being treated to plug up any cracks or holes therein and to render the interior surfaces thereof impermeable.

Referring now to FIG. 3, an injection assembly shown overall as 30 is depicted in more detain but still schematically. The treatment chemical previously described is supplied via a pump (not shown) line 33, and full opening valve 31, to a relatively smaller diameter coaxially aligned tubing 32 comprising stainless steel or other non-reactive (to its highly acidic pH) material. A T-fitting 35 of steel or the like, supplies steam from a steam generator via a steam line 34 into the assembly. The chemical and steam mixture forming the treatment fluid is formed at the exit of tubing 32 in line 36, which may comprise, for example, a zirconium oxide plated pipe or tubing, and is conducted thereby to the rotating spray head or nozzle (not shown in FIG. 3) for delivery to the porous medium to be treated.

This chemical can also be applied as an oligomer of furfuryl alcohol which is then mixed with a solvent such as butyl acetate and catalyzed with an acid such as p-toluene sulfonic acid. It can be applied in an aerosol other than steam (see U.S. Pat. No. 5,199,492) or can in some applications be applied directly (non-sprayed i.e. painted on).

It will be appreciated by those skilled in the art, that changes and modifications could be made or suggested by the foregoing descriptions. It is the aim of the appended claims to cover all such changes and modifications as full within the true spirit and scope of the invention.

We claim:

1. A method for treating a volume of porus medium forming the side and bottom walls of a pit excavation to render a layer thereof immediately adjacent the side and bottom of said pit, relatively impermeable to form a secondary permeability barrier for a storage tank to be placed in said pit, comprising the steps of:

providing a chemical treatment fluid comprising a polymerization monomer, a diluent for the monomer, and a nonvolatile strong acid catalyst capable of causing polymerization of the monomer at fluids injection temperatures;

mixing said chemical treatment fluid with steam to form a multiphase treating fluid;

temporarily covering said pit but providing an injection opening in said temporary cover;

injecting said multiphase treating fluid into said pit through said temporary cover and contacting the side walls and bottom of the pit with said treating fluid; and allowing said treating fluid to remain in contact with the side walls and bottom of said pit for a period of time sufficient to allow polymerization of said monomer to form an impermeable zone of treated medium about the side walls and bottom of said pit as a secondary permeability barrier.

2. A method for treating a subsurface permeable storage tank to render the interior surface thereof relatively impermeable to form a primary permeability barrier, comprising the steps of:

providing a chemical treatment fluid comprising a polymerization monomer, a diluent for the monomer and a nonvolatile strong acid catalyst capable of causing polymerization of the monomer at fluid injection temperatures;

mixing said chemical treatment fluid with steam to form a multiphase treating fluid;

injecting said multiphase treating fluid into a subsurface permeable storage tank, the interior surface of which is to be treated, and contacting the interior surface of said storage tank with said treating fluid; and allowing said injected treating fluid to remain in contact with the interior surface of said storage tank to be treated for a period of time sufficient to allow polymerization of said monomer to form an impermeable zone of treated medium contacting the interior surface of said storage tank.

3. The method of claim 2 wherein said polymerizable monomer is furfuryl alcohol.

4. The method of claim 3 wherein the concentration of the furfuryl alcohol is from 10 to 50 percent by volume of the total treating fluid.

5. The method of claim 4 wherein the diluent comprises a low molecular weight alcohol.

6. The method of claim 5 wherein the diluent is methanol.

7. The method of claim 6 wherein the catalyst is sulfuric acid.

8. The method of claim 7 wherein the concentration of acid catalyst in the chemical treatment fluid is from 0.1 to 1.0 normal.

9. The method of claim 8 wherein the concentration of acid catalyst in the chemical treatment fluid is from 0.25 to 0.5 normal.

* * * * *